Nov. 21, 1944.  E. T. LADD  2,363,066

PROCESS FOR PRODUCING POTASSIUM HYDROXIDE OF HIGH PURITY

Filed Nov. 28, 1941  2 Sheets-Sheet 1

INVENTOR.
Edward Thorndike Ladd,
By Parker, Rockwood & Farmer.
ATTORNEYS.

Nov. 21, 1944.  E. T. LADD  2,363,066
PROCESS FOR PRODUCING POTASSIUM HYDROXIDE OF HIGH PURITY
Filed Nov. 28, 1941    2 Sheets-Sheet 2
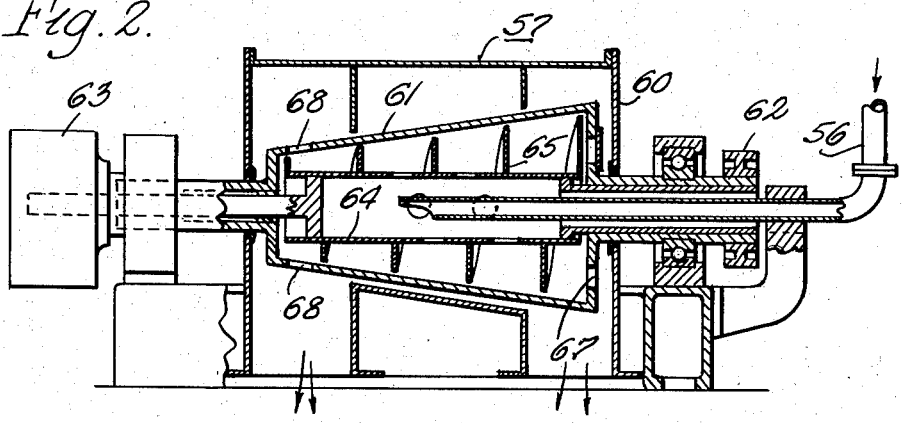
Fig. 2.
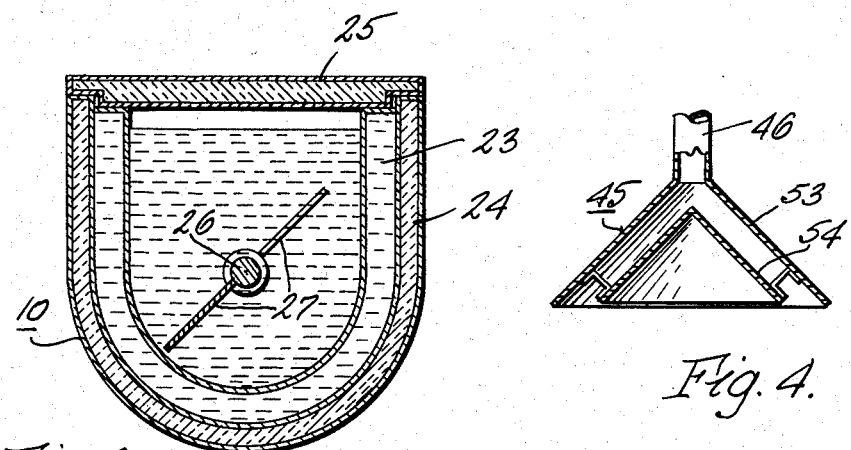
Fig. 3.
Fig. 4.
INVENTOR.
Edward Thorndike Ladd,
By
Parker, Rochnow & Farmer,
ATTORNEYS.

Patented Nov. 21, 1944

2,363,066

UNITED STATES PATENT OFFICE 2,363,066

PROCESS FOR PRODUCING POTASSIUM HYDROXIDE OF HIGH PURITY

Edward Thorndike Ladd, Lewiston Heights, N. Y., assignor to Innis, Speiden & Co., Niagara Falls, N. Y.

Application November 28, 1941, Serial No. 420,848

7 Claims. (Cl. 23—184)

This invention relates to improvements in methods of and apparatus for purifying potassium hydroxide.

One of the objects of this invention is to provide an improved process and apparatus for producing potassium hydroxide which is low in impurities. Another object is to provide a process and apparatus of this type in which crystals of potassium chloride are carried to the top of a tower by an upwardly flowing current of mother liquor while crystals of potassium hydroxide are collected at the bottom of the tower. A further object is to provide a process and apparatus of this type in which the separated crystals of potassium hydroxide are liquefied by heat and then recrystallized by cooling so that potassium chloride remains in solution while the hydroxide crystals are separated from the liquid.

Other objects and advantages of this invention will be apparent from the following description and claims.

In the accompanying drawings:

Fig. 2 is an elevation, partly in section, of a separator which may be used in connection with my improved process and apparatus.

Fig. 3 is a transverse sectional view of a crystallizer trough which may be used in connection with my improved process.

Fig. 4 is a longitudinal sectional elevation of a nozzle or distributor for introducing liquid into a tower.

Figure 1:
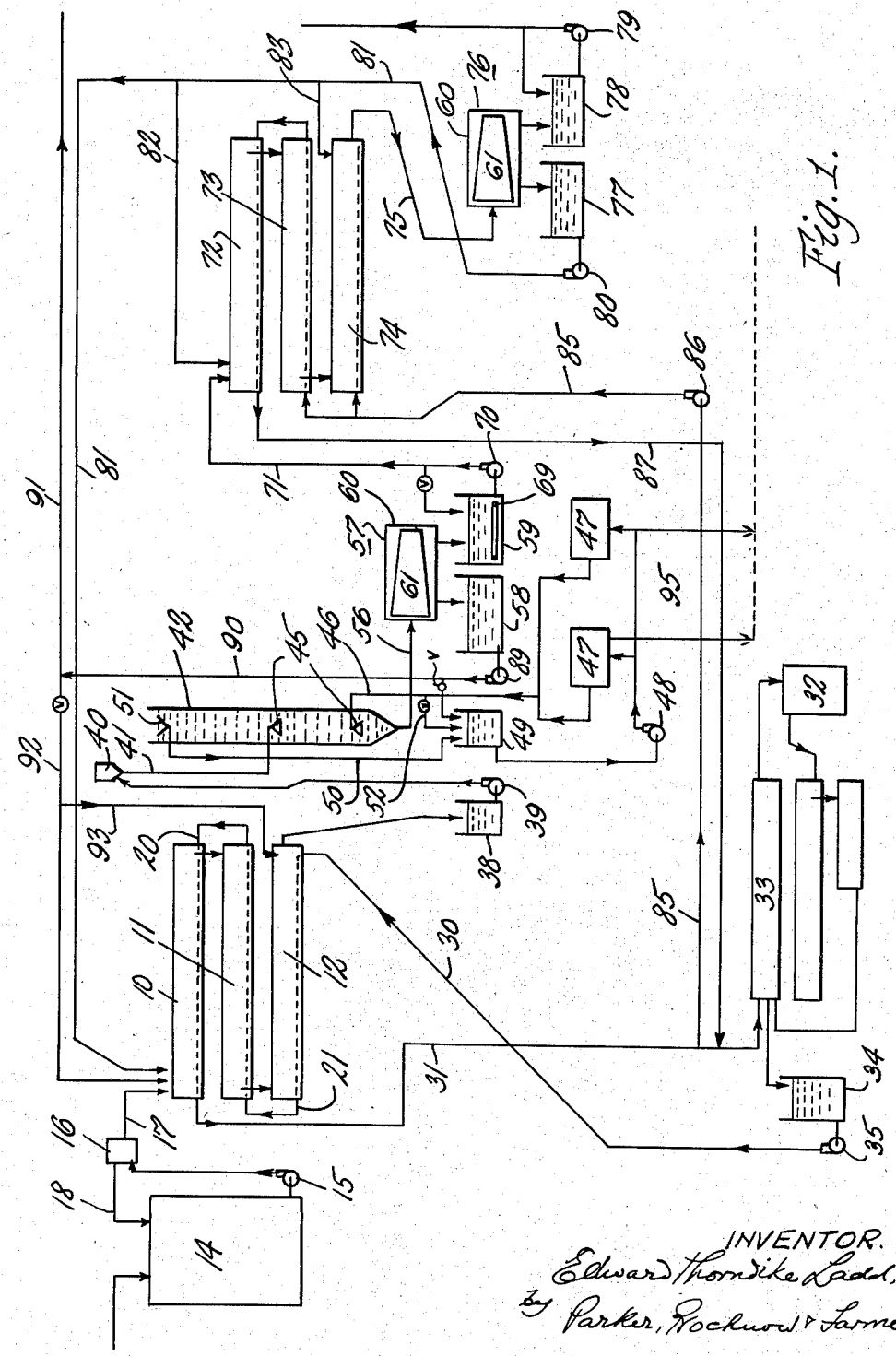
Fig. 1 is a diagrammatic view showing my improved process and apparatus embodying this invention.

Potassium hydroxide cannot be separated in substantially pure form from a commercial solution of the same by crystallization and separation of the crystals from the liquid, for the reason that potassium chloride also becomes crystallized at approximately the same temperature. My invention deals with the separation of these crystallized materials from commercial solutions of the same in connection with the producing of potassium hydroxide of very low potassium chloride content. The liquid containing potassium hydroxide and potassium chloride in solution is chilled to a point at which these two materials become crystallized to a substantial extent. The two crystals are then separated from each other so that a potassium hydroxide is produced which is very low in potassium chloride content.

Suitable means for cooling the original liquid to the desired temperature are provided, it being understood, however, that these cooling means may be omitted in the case of liquids in which the solid particles of the two materials to be separated are present as solids in the liquid without the preliminary step of cooling. The cooling means may be of any suitable or desired form, those shown in the accompanying drawings being in the form of three cooling or crystallizing troughs 10, 11 and 12, into which the liquid to be treated may flow successively from a tank or container 14 for the liquid to be treated. The liquid may be introduced into the cooling or crystallizing troughs in any suitable or desired manner, and in the construction shown a pump 15 is provided which pumps a continuous supply of liquid to a head tank 16 which is located in elevation above the uppermost cooling trough 10. Liquid from this head tank 16 is discharged by a pipe or conduit 17 into one end of the uppermost cooling troughs and the head tank is also provided with an overflow pipe 18 passing back to the supply tank 14. Since a continuous flow of material through the apparatus at a definite rate is desirable, the head tank 16 accomplishes this purpose regardless of the amount of material contained in the tank 14, and furthermore, by pumping an excess of liquid into the head tank 16 which returns to the storage tank 14 through the pipe 18, a continuous mixing of the liquid in the tank 14 results so that a liquid of substantially uniform consistency flows into the cooling troughs 10, 11 and 12. The cooling troughs are preferably arranged one above the other so that liquid from the upper trough 10 flows by gravity through a pipe 20 to the trough 11 and from this latter trough by a pipe 21 to the lower trough 12.

The troughs may be of any suitable or desired construction or may be replaced by any other cooling means. In the construction illustrated each trough is provided with a jacket 23 in which brine or other cooling medium may circulate and suitable insulation 24 may be provided about the jacket 23. 25 represents a removable cover for the top of the trough. The liquid in the trough is kept under constant agitation by any suitable means to prevent the precipitation of crystals in the troughs, and in the construction illustrated in Fig. 3 each trough is provided with a longitudinally extending shaft 26 having paddles or agitators 27 mounted thereon which rotate continuously during the flow of liquid through these troughs.

If the cooling of the liquid in the crystallizing troughs is effected by means of brine, the brine may flow through the jackets of the troughs on the counterflow principle entering the jacket of the lowest trough 12 through a pipe 30 and leaving the receiving end of the upper trough through a discharge pipe 31. 32, Fig. 1, represents diagrammatically a refrigerator, the refrigerant passing through a heat interchange device 33 into which the warm brine flows from the pipe 31 and from which the cold brine is discharged into a tank 34. 35 represents a circulating pump for discharging cold brine into the pipe 30. Any other means for effecting the cooling of the liquid to be treated may be employed and the extent to which the temperature of this liquid is lowered depends entirely upon the nature and concentration of the liquid which is being treated and the solubilities of the materials to be removed from the liquid by crystallization. For example, if the process and apparatus is to be used for the purpose of effecting separation of potassium hydroxide and potassium chloride from a solution containing the same, which contains about 56% of potassium hydroxide, and that potassium chloride is present in this liquid in the form of an impurity to the extent of less than 1% in the original liquid, it has been found that excellent results are obtained, if the liquid leaving the cooling troughs or crystallizers has a temperature of about 35° F.

The liquid from the last crystallizer or cooling trough 12 is discharged into an intermediate storage tank or container 38, from which the liquid containing the crystals is pumped by means of a pump 39 to a head tank 40, from which the liquid flows through a pipe 41 into a separating tower 42. This tower may be of any suitable or desired construction for supporting a substantially upright column of liquid, and the liquid containing the crystals to be separated is admitted into this tower intermediate of the upper and lower ends thereof. When the material under treatment is caustic potash, it is, on leaving the last crystallizer 12, quite thick, resembling snow slush, and carries a heavy crop of hydroxide and chloride crystals in the mother liquor.

If two types of crystals are contained in a liquid, such as a mother liquor, the crystals, if of greater specific gravity than the liquid containing them, will tend to precipitate or settle out of the liquid at different rates of speed. This may be due to the differences in specific gravity of the two solids or to other characteristics of the solids. For example, in operating in connection with the separation of potassium hydroxide crystals from potassium chloride crystals while in the mother liquor, the potassium hydroxide crystals will precipitate or drop to the bottom of a column of mother liquor in less time than the potassium chloride crystals. Consequently, by introducing in the column of liquid contained in the tower 42 an upright flow of mother liquor which is so regulated as to its rate of flow that mother liquor introduced at the lower end of the column will reach the top of the column in slightly less time than would be required for the potassium chloride crystals to collect in the bottom of the column, but at a slower rate than would be required for the potassium hydroxide crystals to drop to the bottom of the column, the result is that the potassium chloride crystals will be carried to the top of the column by the upward current of mother liquor and the potassium hydroxide crystals will drop to the bottom of the column against the flow of the mother liquor.

In applying this principle to the separation of two solids in the column 42, I provide means for introducing mother liquor into the lower portion of the tower, withdrawing mother liquor and particles of the lighter of the two materials from the top of the column, and withdrawing the heavier material from the bottom of the column. The upward flow of mother liquor in the tower 42 is preferably accomplished by means of circuit which includes a filter for removing the solid material withdrawn from the top of the tower and then feeding the filtered mother liquor back to the lower portion of the tower. This may be accomplished by any desired means, for example, as shown in Fig. 1 by providing in the lower portion of the tower 42 a suitable discharge nozzle 45 which receives mother liquor from a pipe 46 leading from one or more filters, two such filters 47 being shown in Fig. 1.

A pump 48 delivers mother liquor to the filters 47 from a tank 49, which receives the overflow from the tower through a pipe 50. The upper end of this pipe receives liquid through a funnel-shaped receiver 51 arranged at the upper end of the tower 42 so that liquid containing solid material which has collected at the top of the tower flows into the receiver 51 and through the pipe 50 to the tank 49. In this manner, a constant and uniform flow of liquid at the desired rate of flow is maintained in the column of liquid in the tower 42.

The desired rate of flow upwardly in the tower 42 may be obtained in any suitable manner, for example, by operating the pump 48 at the desired capacity or by the use of a valve or valves (not shown) in the circuit including the pump and the tower. This regulation of the rate of flow in the tower may also be controlled by means of a valve controlled pipe 52 shown diagrammatically in Fig. 1, by means of which a part of the liquid leaving the filters 47 may be passed into the tank 49 for recirculation. Any other means for producing an upward flow of liquid in the tower 42 may be provided, if desired.

Potassium chloride crystals pass with the mother liquor from the tower through the overflow pipe 50 and are separated from the mother liquor in the filters 47, which may be of any suitable or conventional construction, and which are, consequently, merely indicated diagrammatically in Fig. 1.

In order to provide for a substantially uniform upward flow of liquid in the tower, it is desirable that the circulating liquid, such as mother liquor, be introduced into the lower portion of the column over a relatively large area. Also the liquid from the head tank 40 should be similarly introduced into the tower. For this purpose, liquid discharge nozzles, such as illustrated in Fig. 4, may be used to good advantage. These nozzles include a substantially funnel-shaped downwardly directed member 53, and a second also substantially funnel-shaped or conical member 54 arranged within the member 53 and spaced therefrom. By means of this construction, the liquid passes downwardly and outwardly between the two members 53 and 54 and is discharged into the tower along the inner surface thereof. This type of discharge nozzle, consequently, produces a uniform upward flow in all portions of the tower and causes the minimum of eddying or other disturbance within the tower. Any other type of nozzle for injecting these liquids into the tower may, however, be employed, if desired.

The heavier crystals of potassium hydroxide which have gathered in the bottom of the tower 42, together with a sufficient quantity of mother liquor to carry them, are discharged through a conduit 56, preferably by gravity into a suitable separator 57 in which the mother liquor is separated from the crystals, the mother liquor entering into a tank or container 58 and the crystals or heavier particles into a tank or container 59. Any suitable or desired type of separator may be employed, such for example as a centrifugal filter or separator of the type illustrated more in detail in Fig. 2, in which 60 represents a housing which contains a substantially frusto-conical rotary separator drum 61 rotated through a pulley 62. The liquid containing the solid material enters through the inlet pipe 56 into a hollow tubular member 64 of a spiral or screw conveyor 65. The separator drum 61 is rotated at a relatively high speed which tends to throw the solid particles against the inner face of the drum and the liquid may escape through one or more openings 67 in one of the end walls of the drum 61. The spiral conveyor 65 is rotated in the same direction but at a speed different from that of the drum so that the solid particles or crystals are carried by this screw conveyor toward the opposite end of the drum where they are discharged through a series of openings 68. Preferably a gear drive 63 is provided to rotate the spiral conveyor 65 at the desired speed relatively to the drum 61.

For many purposes, the potassium hydroxide discharged from the separator 57 into the tank or receptacle 59 may be of sufficient purity so that no further processing of this material is necessary. In the separation of potassium chloride from potassium hydroxide, the major portion of the chloride present in the original liquid is removed in the separating tower 42, but some particles of chloride may find their way to the bottom of the column, and furthermore, a small percentage of mother liquor may adhere to the potassium hydroxide crystals and this mother liquor will contain some chloride. Consequently, if potassium hydroxide is required which is extremely low in chloride, further treatment of the crystals collected in the container 59 may be advisable. It would for example, be possible to dissolve the crystals in this container in pure water and again pass the resulting solution through the apparatus which has been described or a similar apparatus. I have, however, found that in the further treatment of the crystals, the separating tower may be dispensed with. The further treatment, consequently, may be carried on as follows:

The crystals in the container 59 may be melted by applying heat thereto in the container 59. For this purpose, a heating coil 69 may be provided in the lower part of the container 59, which raises the temperature of the crystals to a point sufficient to completely liquefy the same, for example, to about 108° F. in the case of potassium hydroxide crystals. In order to assure the raising of the temperature of all of the material in the container to the same extent and to keep the composition of the material in this tank uniform, a pump 70 is preferably provided which withdraws liquefied material from this tank and delivers it to a pipe 71 having a branch through which a part of the pumped material is returned to the tank 59, thus producing a circulation of material which results in a thorough mixing of the material in this tank. The pipe 71 also conducts a part of this material to another series of crystallizers or cooling troughs 72, 73 and 74 which may be identical in construction with the cooling troughs 10, 11 and 12 hereinbefore described. In this second series of cooling troughs, the liquid may then be lowered to a temperature at which a substantial portion of this liquid again becomes crystallized, for example, to a temperature of about 86° F. for potassium hydroxide crystals.

The material, including the mother liquor and crystals leaving the crystallizers or cooling troughs is in substantially the same condition as the material leaving the crystallizer 12 and may then be conducted by means of a conduit 75 to another centrifugal separator 76 which may be similar to the separator 57 hereinbefore described. In this separator 76, there is a cleancut separation made between the mother liquor, which is discharged into the tank 77 and the very pure crystals of potassium hydroxide which are discharged into the tank 78. At this relatively high temperature, the small quantity of potassium chloride left in the mother liquor does not become crystallized, and consequently, the material which is discharged into the tank 78 has been found to contain potassium chloride only from .03% down to an insignificant amount, the crystals being substantially pure potassium hydroxide with a certain amount of water of crystallization.

In the tank 78, the crystals may be dissolved in pure water, preferably distilled water, which may, for example, be obtained from the steam condensed in the heating coil 69, and recirculated through the tank 78 and discharged by means of a pump 79. The mother liquor entering the tank 77 which still contains a relatively large percentage of uncrystallized potassium hydroxide may be returned by means of another pump 80 and through a conduit 81 to the first crystallizer or cooling trough 10. Branch pipes 82 and 83 may connect with the pipe 81 and be controlled by suitable valves to permit small amounts of mother liquor to return to the crystallizer troughs 72 and 74 as indicated in Fig. 1, as may be required to facilitate the flow of material through these troughs and the separator 76.

Since the liquid in the second set of crystallizer troughs is cooled to a much higher temperature than that in the first set of troughs, brine for cooling these troughs may be delivered from the discharge or return flow pipe 31 through pipes 85 and pump 86 to the second set of crystallizer troughs, the returned brine flowing through pipe 87 back to the pipe 31 for passage through the heat exchanger 33 of the refrigerating system.

When this process is used in connection with the production of potassium hydroxide low in potassium chloride, other impurities contained in the liquid are also removed in this process for the reason that they do not become crystallized and remain in the mother liquor. For example, iron oxide and iron hydroxide are removed in this manner from the potassium hydroxide crystals by separators 57 and 76, so that the resulting potassium hydroxide is extremely low in impurities.

It will be evident from the foregoing that by selecting different concentrations of the raw liquid to be treated, and by subjecting this liquid in the crystallizing or cooling troughs 10, 11 and 12 and 72, 73 and 74, to different cooling temperatures, different yields may be produced and different efficiencies and different degrees of purity of the final product produced.

The process, of course, removes only a certain percentage of the potassium hydroxide from the mother liquor, or in other words, reduces the concentration of the mother liquor. Consequently, all or a part of the mother liquor passing into the tank 58 may be removed from the system and sold as potassium hydroxide of lower concentration and of slightly less purity than the final product delivered to the tank 78, but it will be noted that the mother liquor discharged from the tank 58 will be freed through the action within the tower 42 of a large percentage of its potassium chloride content. This mother liquor, consequently, may be pumped from the tank 58 by means of a pump 89 to a pipe 90, one branch 91 of which may conduct mother liquor out of the system, and another branch 92 of which may return some of this mother liquor to the first cooling trough or crystallizer 10 or through a branch pipe 93 to the last trough 12 of this group, if such mother liquor should be needed for recirculation in the system. If desired, some of the liquor from pipe 90 may be passed directly to tank 49 through the short valve controlled passage shown in Fig. 1.

The crystals of potassium chloride remaining in the filters 47 may be washed out or removed therefrom and the washed liquid discharged through pipes 95, for whatever use may be desired.

The process and apparatus herein described has been used successfully for producing potassium hydroxide of extremely low chloride content. The process is economical to operate and efficient, and since the temperatures in the various parts of the apparatus can be readily controlled automatically, the apparatus requires comparatively little attention while in operation.

I claim as my invention:

1. A process of producing potassium hydroxide of high purity from a solution containing potassium hydroxide and not more than about 1% of potassium chloride, which comprises chilling the solution to a temperature of about 35° F., agitating the solution during chilling to prevent precipitation of the crystals formed during chilling, introducing the solution containing said crystals into a column of said mother liquor, at a point intermediate of the top and bottom of said column, producing an upward flow of mother liquor in said column at a rate, substantially uniform from the lower portion of the column to the upper portion thereof, sufficient to carry most of the potassium chloride crystals to the top of the column and to permit the crystals of potassium hydroxide carrying with them a very small part of potassium chloride to drop by gravity to the bottom of the column, removing liquor containing potassium chloride from the top of the column, separating the crystals of potassium chloride from the liquor and returning said liquor to the lower portion of said column to produce said upward flow therein, removing liquid containing said potassium hydroxide and said small part of potassium chloride from the bottom of said column, separating the crystals from said last mentioned liquor, melting said last mentioned crystals by raising the same to a temperature of about 108° F., then chilling the resulting liquid to a temperature of about 86° F. to cause crystallization of some of the potassium hydroxide while the potassium chloride remains in solution, separating the crystals from said last mentioned solution, and washing said remaining crystals to remove said last mentioned solution therefrom.

2. A process of producing potassium hydroxide of high purity from a solution containing potassium hydroxide and not more than about 1% of potassium chloride, which comprises chilling the solution to a temperature of about 35° F., agitating the solution during chilling to prevent precipitation of the crystals formed during chilling, introducing the solution containing said crystals into a column of said mother liquor, at a point intermediate of the top and bottom of said column, producing an upward flow of mother liquor in said column at a rate, substantially uniform from the lower portion of the column to the upper portion thereof, sufficient to carry most of the potassium chloride crystals to the top of the column and to permit the crystals of potassium hydroxide carrying with them a very small part of potassium chloride to drop by gravity to the bottom of the column, removing liquor containing potassium chloride from the top of the column, separating the crystals of potassium chloride from the liquor and returning said liquor to the lower portion of said column to produce said upward flow therein, removing liquor containing said potassium hydroxide and said small part of potassium chloride from the bottom of said column, separating the crystals from said last mentioned liquor, melting said last mentioned crystals by raising the same to a temperature of about 108° F., then chilling the resulting liquid to a temperature of about 86° F. to cause crystallization of some of the potassium hydroxide while the potassium chloride remains in solution, separating the crystals from said last mentioned solution, and returning said last mentioned solution to the starting solution for reprocessing.

3. A process of producing potassium hydroxide of high purity from a solution containing potassium hydroxide and a small quantity of potassium chloride in the form of an impurity, which comprises chilling the solution to a temperature at which both potassium hydroxide and potassium chloride crystals are formed in the solution, introducing the solution containing said crystals into a column of said mother liquor, at a point intermediate of the top and bottom of said column, producing an upward flow of mother liquor in said column at a rate, substantially uniform from the lower portion of the column to the upper portion thereof, sufficient to carry most of the potassium chloride crystals to the top of the column and to permit the crystals of potassium hydroxide carrying with them a very small part of potassium chloride to drop by gravity to the bottom of the column, removing liquor containing potassium chloride from the top of the column, separating the crystals of potassium chloride from the liquor and returning said liquor to the lower portion of said column to produce said upward flow therein, removing liquor containing said potassium hydroxide and said small part of potassium chloride from the bottom of said column, separating the crystals from said last mentioned liquor, liquefying said last mentioned crystals, and then chilling the resulting liquid to a temperature sufficient to cause crystallization of some of the potassium hydroxide while the potassium chloride remains in solution, and separating the crystals of potassium hydroxide from said last mentioned solution.

4. A process of producing potassium hydroxide of high purity from a solution containing potassium hydroxide and a small quantity of potassium chloride in the form of an impurity, which comprises chilling the solution to a temperature at which both potassium hydroxide and potassium chloride crystals are formed in the solution, introducing the solution containing said crystals into a column of said mother liquor, at a point intermediate of the top and bottom of said column, producing an upward flow of mother liquor in said column at a rate substantially uniform from the lower portion of the column to the upper portion thereof, sufficient to carry most of the potassium chloride crystals to the top of the column and to permit the crystals of potassium hydroxide carrying with them a very small part of potassium chloride to drop by gravity to the bottom of the column, removing liquor containing potassium chloride from the top of the column, removing liquor containing said potassium hydroxide crystals and said small part of potassium chloride from the bottom of said column, separating the crystals from said last mentioned liquor, liquefying said last mentioned crystals, chilling the resulting liquid to a temperature low enough to cause crystallization of some of the potassium hydroxide while the potassium chloride remains in solution, and separating the potassium hydroxide crystals from said last mentioned solution.

5. A process of producing potassium hydroxide of high purity from a solution containing mainly potassium hydroxide and having potassium chloride as an impurity therein, which comprises chilling the solution while agitated to produce crystals of potassium hydroxide and potassium chloride in a mother liquor, introducing the solution containing said crystals into a column of said mother liquor at a point intermediate of the top and bottom of said column, producing upward flow of mother liquor in said column at a rate substantially uniform from the lower portion of the column to the upper portion thereof sufficient to carry potassium chloride crystals to the top of the column and permit the heavier hydroxide crystals carrying with them a very small part of potassium chloride to drop by gravity to the bottom of the column against the flow of mother liquor therein, removing mother liquor containing crystals from the top and bottom of said column, separating the crystals withdrawn from the bottom of said column from the liquor containing them, melting said last mentioned crystals to a liquid state, and then chilling them to a temperature not materially in excess of about 86° F. to cause crystallization of some of the potassium hydroxide while the potassium chloride remains in solution, and separating the crystals thus formed from the liquid.

6. A process of separating potassium chloride and potassium hydroxide from each other and from a solution containing them, which includes chilling said solution to a temperature at which crystals of both of these materials are formed in a mother liquor, agitating said solution during the chilling of the same to prevent precipitation of crystals formed, introducing said solution containing said crystals into an intermediate portion of an upwardly flowing column of mother liquor, controlling the rate of flow of mother liquor upwardly in said column so that potassium chloride particles will be carried to the top of the column and potassium hydroxide particles carrying with them a very small part of potassium chloride will drop by gravity to the bottom of the column, removing crystals of potassium chloride and mother liquor from the top of the column, removing crystals and mother liquor from the bottom of the column, separating said last mentioned crystals from said mother liquor, liquefying said crystals, chilling the resulting liquid to a temperature materially higher than the first chilling temperature at which a part of said potassium hydroxide crystallizes and at which the potassium chloride remains in solution, and then separating the resulting potassium hydroxide crystals from the liquid.

7. A process of producing potassium hydroxide of high purity from a solution containing mainly potassium hydroxide and not more than about 1% potassium chloride, which includes chilling said solution to a temperature at which crystals of both of these materials are formed in a mother liquor, introducing said solution containing said crystals into an intermediate portion of an upwardly flowing column of mother liquor, controlling the rate of flow of mother liquor upwardly in said column so that most of the potassium chloride particles will be carried to the top of the column and potassium hydroxide particles carrying with them a very small part of potassium chloride will drop by gravity to the bottom of the column, removing crystals of potassium chloride and mother liquor from the top of the column, removing the crystals from the bottom of said column, separating said last mentioned crystals from mother liquor, liquefying said separated crystals, cooling said liquid to a temperature at which some of the potassium hydroxide contained therein becomes crystallized while the potassium chloride remains in solution in the liquid, and separating said last mentioned crystals from said liquid.

EDWARD THORNDIKE LADD.